(12) United States Patent
Welchel et al.

(10) Patent No.: US 7,651,217 B2
(45) Date of Patent: Jan. 26, 2010

(54) EYEWEAR WITH ENHANCED FIT

(75) Inventors: Debra N. Welchel, Woodstock, GA (US); Ming Xie, Marietta, GA (US); Megan Christine Hansen Smith, Roswell, GA (US); Herb Flores Velazquez, Neenah, WI (US); Matrice Brown Jackson, Woodstock, GA (US); Lourdes Lizzette Sheffield, Acworth, GA (US); Joseph Mitchell, Alpharetta, GA (US); Russell J. Kroll, Woodstock, GA (US); Philip D. Palermo, Marietta, GA (US); Mark D. Londborg, Atlanta, GA (US); Suzuko Hisata, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 12/264,287

(22) Filed: Nov. 4, 2008

(65) Prior Publication Data

US 2009/0055988 A1 Mar. 5, 2009

Related U.S. Application Data

(62) Division of application No. 11/413,521, filed on Apr. 28, 2006, now abandoned.

(51) Int. Cl.
*G02C 5/20* (2006.01)
(52) U.S. Cl. .................. 351/115; 351/118; 351/119; 351/110
(58) Field of Classification Search ................ 351/110, 351/115, 116, 118–119
See application file for complete search history.

(56) References Cited

U.S. PATENT DOCUMENTS

| 182,013 A | 9/1876 | Andross |
| 1,026,272 A | 5/1912 | Leveque |
| 1,562,350 A | 11/1925 | Luckey |
| 3,377,626 A | 4/1968 | Smith |
| 4,209,234 A | 6/1980 | McCooeye |
| 4,250,577 A | 2/1981 | Smith |
| 4,419,993 A | 12/1983 | Petersen |

(Continued)

FOREIGN PATENT DOCUMENTS

DE 3323670 1/1985

(Continued)

OTHER PUBLICATIONS

Patent Abstracts of Japan, JP 2005215324, Publication Date: Aug. 11, 2005.

(Continued)

*Primary Examiner*—Huy K Mai
*Assistant Examiner*—Vipin M Patel
(74) *Attorney, Agent, or Firm*—Nathan P. Hendon; Sue C. Watson (57) ABSTRACT

Eyewear having an enhanced fit which may be used for safety, sports, and the like. The eyewear may provide features which permit enhanced airflow and an enhanced fit to a user's face. Such features may include greater adjustability to provide greater comfort. Eyewear including an RFID tag which is activated to send or receive transmissions when the eyewear is unfolded and/or positioned in a position to be worn by a user.

5 Claims, 6 Drawing Sheets

U.S. PATENT DOCUMENTS

| | | | |
|---|---|---|---|
| 4,638,728 A | 1/1987 | Elenewski |
| 4,796,621 A | 1/1989 | Barle et al. |
| 4,799,782 A | 1/1989 | Tuttle |
| 4,863,257 A | 9/1989 | Morgan |
| 4,868,929 A | 9/1989 | Curcio |
| 4,937,880 A | 7/1990 | Beard |
| 4,942,626 A | 7/1990 | Stern et al. |
| 5,107,543 A | 4/1992 | Hansen |
| 5,162,823 A | 11/1992 | Goldstein |
| 5,191,364 A | 3/1993 | Kopfer |
| 5,319,397 A | 6/1994 | Ryden |
| 5,351,339 A | 10/1994 | Reuber et al. |
| 5,363,153 A | 11/1994 | Bailiff |
| 5,363,512 A | 11/1994 | Grabos, Jr. et al. |
| 5,416,536 A | 5/1995 | Tee, Jr. |
| 5,457,505 A | 10/1995 | Canavan et al. |
| 5,459,533 A | 10/1995 | McCooeye et al. |
| 5,469,229 A * | 11/1995 | Greenbaum ............... 351/44 |
| 5,517,700 A | 5/1996 | Hoffman |
| 5,584,078 A | 12/1996 | Saboory |
| 5,610,669 A | 3/1997 | Kuipers et al. |
| 5,652,637 A | 7/1997 | Marini |
| 5,720,281 A | 2/1998 | Allen et al. |
| 5,898,468 A | 4/1999 | Mage |
| 5,907,385 A | 5/1999 | Flores et al. |
| 5,956,117 A | 9/1999 | Suh et al. |
| 5,956,119 A | 9/1999 | Gibbs |
| 5,969,787 A | 10/1999 | Hall et al. |
| 6,094,751 A | 8/2000 | Parks |
| 6,318,369 B1 | 11/2001 | Gregory |
| 6,637,038 B1 | 10/2003 | Hussey |
| 6,701,537 B1 | 3/2004 | Stamp |
| 6,783,235 B1 | 8/2004 | Lin |
| 6,959,988 B1 | 11/2005 | Sheldon |
| 7,077,137 B2 | 7/2006 | Russell |
| 7,175,274 B1 | 2/2007 | Markson |
| 7,372,646 B2 | 5/2008 | Spivey |
| 2003/0035082 A1 | 2/2003 | Olney |
| 2004/0066486 A1 | 4/2004 | Yi |
| 2004/0069302 A1 | 4/2004 | Wilson et al. |
| 2004/0100384 A1 | 5/2004 | Chen et al. |
| 2004/0107483 A1 | 6/2004 | Thorson |
| 2004/0125334 A1 | 7/2004 | Olney |
| 2005/0012893 A1 | 1/2005 | Yamamoto |
| 2005/0160521 A1 | 7/2005 | Hussey |
| 2005/0174470 A1 | 8/2005 | Yamasaki |
| 2005/0237477 A1 | 10/2005 | Lindahl |
| 2005/0270478 A1 | 12/2005 | Curci et al. |
| 2005/0286734 A1 | 12/2005 | Wang |
| 2006/0001827 A1 | 1/2006 | Howell et al. |

FOREIGN PATENT DOCUMENTS

| | | |
|---|---|---|
| GB | 264280 | 1/1927 |
| GB | 489530 | 7/1938 |
| GB | 2362472 | 11/2001 |
| WO | WO 97/04837 | 2/1997 |
| WO | WO 97/50013 | 12/1997 |
| WO | WO 98/39682 | 9/1998 |
| WO | WO 99/55180 | 11/1999 |
| WO | WO 02/02039 | 1/2002 |
| WO | WO 2004/098715 | 11/2004 |

OTHER PUBLICATIONS

Patent Abstracts of Japan, JP 2005269572, Publication Date Sep. 29, 2005.

* cited by examiner

EYEWEAR WITH ENHANCED FIT

This application is a Divisional of U.S. patent application Ser. No. 11/413,521, filed Apr. 28, 2006 now abandoned, which is incorporated by reference herein.

BACKGROUND OF THE INVENTION

This invention relates to eyewear, and especially eyewear used for safety and/or activities such as sports.

Eyewear for safety applications in industrial use and/or sports are used to protect a user's eyes. Such eyewear is usually designed to fit relatively closely to a user's face, so that noxious gas, liquid, particles, contaminants, and the like, do not touch or affect a user's eye(s).

Safety and some sports glasses or eyewear are often designed and formed such that they are bulky and heavy to wear. Some are tight-fitting and uncomfortable as well, such as goggles or masks. In addition, such eyewear is often provided as in only a few sizes which do not fit every user's face. This results in poor compliance in users donning and wearing the eye wear. Further, poor-fitting eyewear may actually make it more difficult for a user to see. Eyewear which is too small may not adequately cover and/or protect a user's eyes.

Therefore, safety and/or sports eyewear which provides is lightweight and provides adjustments which provides a better individual fit each user's face would be desirable. Such eyewear desirably may provide adjustments to the lens area as well as the temple/ear pieces of the eyewear. The eyewear desirably may include protection for peripheral vision, and an adjustable securing apparatus for holding the eyewear on a user's head. In addition, such eyewear may provide some design features which makes it more attractive to wear.

DEFINITIONS

As used herein, the term "glasses" or "eyewear" refers to eyeglasses, goggles, or other objects worn over the eyes.

As used herein, the terms "ear piece" or "ear pieces" refers to The portion of glasses or eyewear which extends from a lens and/or frame to extend over and/or about a portion of a user's ear to assist in holding the glasses or eyewear on a user's head.

As used herein, the phrase "custom fit" refers to an item that is provided or made in a proper size, shape and fit for the individual, particularly, to fit the contours of a certain area of an individual's body (For example, "These shoes were made to fit my feet very well.").

As used herein, the term "contour" refers to at least a portion of an item which is shaped to fit the outline or form of something (Example, "A contour sheet").

As used herein, the term "hinge" or "hinges" refers to a jointed or flexible device that connects and permits pivoting or turning of a part to a stationary component. Hinges include, but are not limited to, metal pivotable connectors, such as those used to fasten a door to frame, and living hinges. Living hinges may be constructed from plastic and formed integrally between two members. A living hinge permits pivotable movement of one member in relation to another connected member.

As used herein, the terms "contaminate", "contaminant" and/or "contamination" mean to make unclean or impure by contact. Such contact may be by liquid, solid and/or gas. For example, but not by way of limitation, mud that befouls shoes; noxious fumes that foul the air; bodily fluids that foul clean diapers.

As used herein, the term "fasteners" means devices that fasten, join, connect, secure, hold, or clamp components together. Fasteners include, but are not limited to, screws, nuts and bolts, rivets, snap-fits, tacks, nails, loop fasteners, and interlocking male/female connectors, such as fishhook connectors, a fish hook connector includes a male portion with a protrusion on its circumference. Inserting the male portion into the female portion substantially permanently locks the two portions together.

As used herein, the term "couple" includes, but is not limited to, joining, connecting, fastening, linking, or associating two things integrally or interstitially together.

As used herein, the term "configure" or "configuration" means to design, arrange, set up, or shape with a view to specific applications or uses. For example: a military vehicle that was configured for rough terrain; configured the computer by setting the system's parameters.

As used herein, the term "substantially" refers to something which is done to a great extent or degree; a significant or great amount; for example, as used herein "substantially" as applied to "substantially" covered means that a thing is at least 90% covered.

As used herein, the term "alignment" refers to the spatial property possessed by an arrangement or position of things in a straight line or in parallel lines.

As used herein, the terms "orientation" or "position" used interchangeably herein refer to the spatial property of a place where or way in which something is situated; for example, "the position of the hands on the clock."

As used herein, the term "about" refers to an amount that is plus or minus 10 percent of a stated or implied range.

As used herein, the term "resilient" and "resiliency" refers to the physical property of an object and/or a material that can return to its original shape or position after deformation that does not exceed its elastic limit.

These terms may be defined with additional language in the remaining portions of the specification.

SUMMARY OF THE INVENTION

The present invention is directed to eyewear for protecting a user's eyes. The eyewear includes at least one lens and a pair of ear pieces. The lens has at least one first portion positioned adjacent the user's nose and at least one second portion which is positioned adjacent an outer edge of the user's eye when the eyewear is positioned on the user's face. The lens is positioned to extend a distance from the user's eye and is configured to cover the user's eye from the distance. Each ear piece has a first end which is pivotably coupled to the lens adjacent at least one second portion of the lens. The ear pieces are configured to hold the lens against at least a portion of the user's face and permit the lens to pivot upward and downward on the user's face when the eyewear is positioned on the user's face.

The present invention is also directed to eyewear that includes at least one lens and a pair of ear pieces, where each ear piece has a first end which is configured to be slideably and releasably coupled to the upper edge of the lens and a second end which is formed to be positioned adjacent a user's ear when the eyewear is positioned on the user's face. When each ear piece is releasably coupled to the lens, it may be slideably moved along the upper edge of the lens to permit the ear pieces to move closer or farther away from the user's head such that the combination of the lens and each ear piece cooperate to provide a custom fit to the user's head.

Also, the present invention is directed to eyewear that includes a pair of lenses, a frame that incudes a brow piece positioned between the lenses, and a pair of spaced-apart ear pieces configured to hold the lenses against at least a portion of the user's head. The frame includes a nose piece which is configured to extend over at least a portion of the user's nose. Each lens is movably coupled to the nose piece such that each lens individually pivots away from the brow piece of the frame such that each lens is only in contact with the nose piece.

The present invention is further directed to eyewear that includes at least one lens and a frame that is coupled to at least a portion of one edge of the lens. The frame is configured to extend about a circumference of the user's head and includes a tension controller configured to adjust the tension of the frame against the user's face and head.

Additionally, the present invention is also directed to eyewear that includes a pair of first lenses, a frame including a brow portion position between a pair of ear pieces, and a pair of second lenses. Each of the first lenses has an outer edge, at least one first portion positioned adjacent the user's nose, and at least one second portion positioned adjacent an outer edge of the user's eye when the eyewear is positioned on the user's face. The first lenses are positioned to extend a distance from the user's eyes and cover the user's eyes from the distance. At least a portion of the brow portion of the frame is coupled to the first lenses along the outer edge of the first lenses and the ear pieces are configured to cooperate with the brow portion to hold the lenses in a position on the user's face. The pair of second lenses are slideably coupled to the frame and are slideably moveable to a position next to the first lenses.

Finally, the present invention is also directed to eyewear that includes at least one lens and a pair of ear pieces, where at least one of the ear pieces has a moveable connector and an RFID tag. The RFID tag is connected to one contact point, provided on a portion of the ear piece positioned adjacent the connector, and another contact point positioned on the eyewear. When the eyewear is opened for use and the ear piece is moved into a position to be donned by the user, the one contact point contacts the other contact point to provide a circuit which permits the RFID tag to send or receive a transmission from an RFID tag reader/scanner.

DETAILED DESCRIPTION

Reference will now be made in detail to one or more embodiments of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

Safety glasses and/or glasses used in sports applications are usually made with shatter-resistant plastic lenses to protect the eye. Although safety lenses may be constructed from a variety of materials that vary in impact resistance, certain standards suggest that they maintain a minimum 1 millimeter thickness at the thinnest point, regardless of material. Safety glasses can vary in the level of protection that they provide based on their intended application. For example, those used in medicine may be expected to protect against blood splatter while safety glasses in a factory might have stronger lenses and a stronger frame and may include additional shields or safety features. The lenses of safety glasses may be shaped for correction or magnification. Some safety glasses may also be designed to fit over corrective glasses or sunglasses.

While face shields, goggles, and so forth are available as well, some studies have suggested that they will not always be used due to their bulkiness and weight. Therefore, lighter weight eyewear, while not providing as much protection as full face shields and/or goggles, may be preferred and actually worn more frequently by users due to their lack of size or bulk and their reduced weight. In addition, recent studies have also suggested that when safety glasses are both light weight and have a more stylish design, these features in combination also result in a higher usage of safety glasses in the appropriate situations.

The lenses of safety glasses are desirably made from plastic. There are a number of suitable plastics which may be utilized. Examples of some plastics used for eyewear include polycarbonates, such as LEXAN® manufactured by General Electric, Fairfield, Conn., allyl diglycol polycarbonate such as CR-39® manufactured by PPG Industries, Pittsburgh, Pa., and thermoplastic elastomers (TPE) such as Kraton® or Dynaflex® produced by GLS, McHenry, Ill.

Other materials may also be available for making lenses; other materials may be added to or provided via, for example, but not by way of limitation, a coating, cover, and so forth provided to the lenses to provide additional features. Such features may include, but are not limited to ultraviolet (UV) light protection, anti-fogging protection, anti-reflective (AR) protection, and so forth. Safety and/or sports glasses may desirably be ranked according to meeting certain requirements. In the United States, the American National Standards Institute (ANSI) has various standards and ratings for safety glasses. Safety glasses may be rated according to their ability to resist, for example, flying debris, heat, sparks, acid splash, abrasive blasting materials, glare, radiation, and so forth.

Safety and/or sports glasses may have numerous uses in a household situation. Safety glasses may be used while painting, while cutting grass, and so forth. Many different types of sports have found protective eyewear useful as well. Safety glasses or eyewear are increasingly needed for new industrial, home and sports applications.

Figure 1:
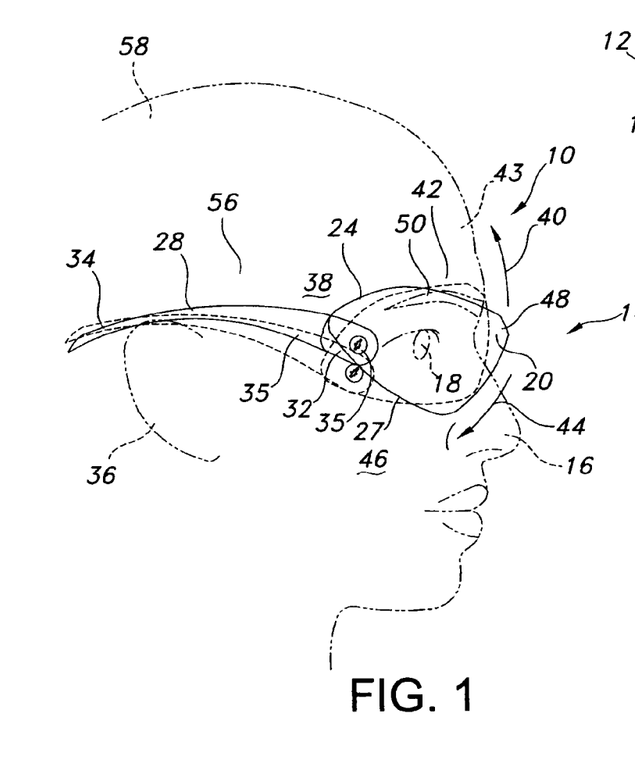
FIG. 1 is a side view of the eyewear of the present invention, showing a common lens extending across a user's eyes and pivotable ear pieces coupled thereto.
Figure 2:
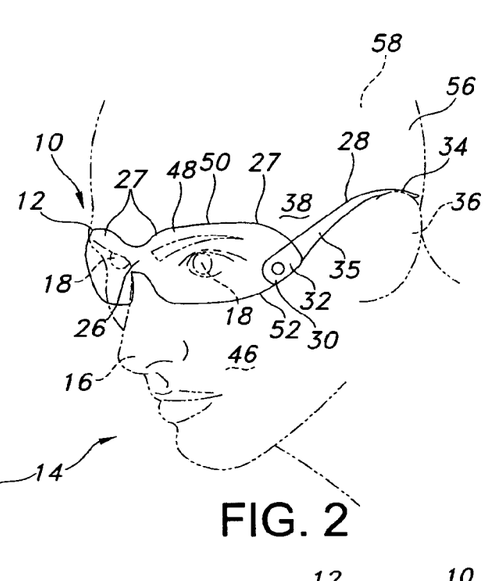
FIG. 2 is a perspective view of the eyewear of FIG. 1.
Figure 3:
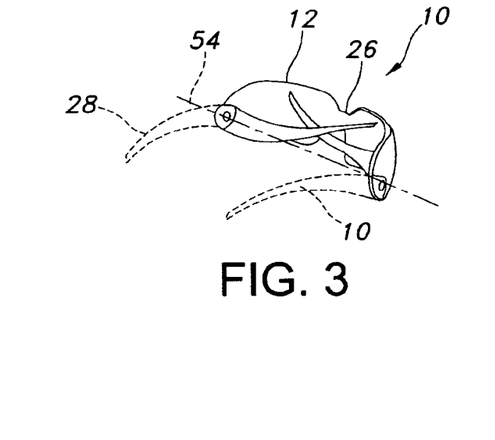
FIG. 3 is a perspective view of the eyewear of FIGS. 1 and 2, but shown removed from a user's face with possible folding options.

Referring now to FIGS. 1-18 in general, and 1-3 in particular, the present invention provides eyewear adapted to protect a user's eyes. In the present embodiment, the eyewear 10 includes at least one lens 12, as illustrated in FIGS. 1-3. The lens may include a single lens 12 which extends generally across a user's face 14 and specifically across a user's nose 16 to cover both eyes 18 and thereby to provide protection to both eyes 18.

Desirably the lens 12 extends a distance 20 from the user's eyes and is configured to cover or extend over each of a user' eyes 18 from the distance 20 to provide protection thereto. The lens 12 desirably includes at least one, and in this embodiment a pair of first portions 22 which are positioned adjacent a user's nose 16. The lens 12 desirably also includes a pair of second portions 24 which are positioned adjacent an outer edge 25 of a user's eye 18. The lens 12 includes a connector 26 which is positioned across a user's nose 16. The lens 12 may include a frame positioned about at least a portion of an outer edge 27 of the lens 12 (not shown).

A pair of ear pieces 28 are desirably coupled to the lens 12 on or near a lower area 30 of the outer edge 27 and near the second portions 24. Each ear piece 28 is configured to hold the lens 12 adjacent a user's face 14. Desirably, each ear piece 28 includes a first end 32 and a second end 34. A temple piece 35 desirably extends between the first end 32 and the second end 34.

The first end 32 of each ear piece 28 is desirably pivotably coupled near the second portions 24 of the lens 12. The second end 34 desirably is positioned over and/or around a portion of a user's ear 36 when the eyewear 10 is being worn. Similarly, the temple piece 35 is desirably configured to be positioned adjacent a user's temple 38.

The pivotable coupling of the ear pieces 28 to the lens 12 permits the eyewear 12 to be moved on a user's face 14 to provide greater protection to certain areas of a user's face 14. The lens 12 and the pair of ear pieces 28 are configured such that the lens 12 may be pivotably rotated or moved in a direction 40 upward so that the lens 12 fits more closely against a users brow 42 and/or forehead 43. When this occurs, the first end 32 of each ear piece 28 may remain in position. Alternatively, the first end of each ear piece 28 may move in a direction 44 downward. Conversely, the lens 12 and the pair of ear pieces 28 are configured such that the lens 12 may be moved in the direction 44 downward so that the lens 12 fits more closely against a user's cheeks 46. When this occurs, the first end 32 of each ear piece 28 may remain in position. Alternatively however, the first end of each ear piece 28 moves in a direction 40 upward. In a further alternative, however, the first end 32 of each ear piece 28 may remain in position on a user's head without movement or pivoting. The adjustability of the lens 12 and/or the earpieces 28 as well provides an enhanced fit.

The ear pieces 28 each pivotably move on a pivot post (not shown) such that, when the eyewear 10 is removed from a user's face, each ear piece 28 may pivotably move to permit each ear piece 28 to move into a closed position adjacent the lens 12 for storage, as illustrated in FIG. 3.

The lens 12 desirably includes along an upper edge 50, a curved upper portion 52 which is configured to follow and conform to the contour and configuration of a user's brow 42 and/or forehead 43. The lens 12 also may include a curved lower portion 52 positioned along and/or adjacent a lower area 30 and the outer edge 27 of the lens 12 which is also configured to follow and conform to the contours and configuration of a user's cheeks 46. The curved upper portion 48 and/or the curved lower portion 52 assist in providing a custom fit of the eyewear 10 to a user's face 14.

Desirably, at least a portion of each ear piece 28 has some resiliency to permit a comfortable fit of the eyewear 10 against a user's face and head. Such resiliency may also assist in providing the ear pieces 28 in a folded or closed position against the lens 12 for storage. In addition, at least a portion of the lens may include some resiliency.

The lens 12 and each ear piece 28 pivot on an axis 54. Desirably, when the eyewear 10 is being worn and a user is in an upright position, the axis 54 is horizontal.

In an alternative embodiment, it will be appreciated that the lens 12 may be provided as a pair of lenses, with one lens extending over one of each of the eyes of a user when the eyewear is positioned on a user's face (not shown). In such an embodiment, a nose piece will desirably be provided to assist in holding the lenses 12 to a user's face (not shown). Alternatively, a nose piece may be provided as a portion of a frame (not shown), or at least a portion of a nose piece may be coupled to the lens 12 of the present embodiment (not shown). A frame may be coupled to a portion of the lens (not shown). The earpieces may be provided as a portion of such a frame (not shown).

Figures 4, 5, 6, 7:
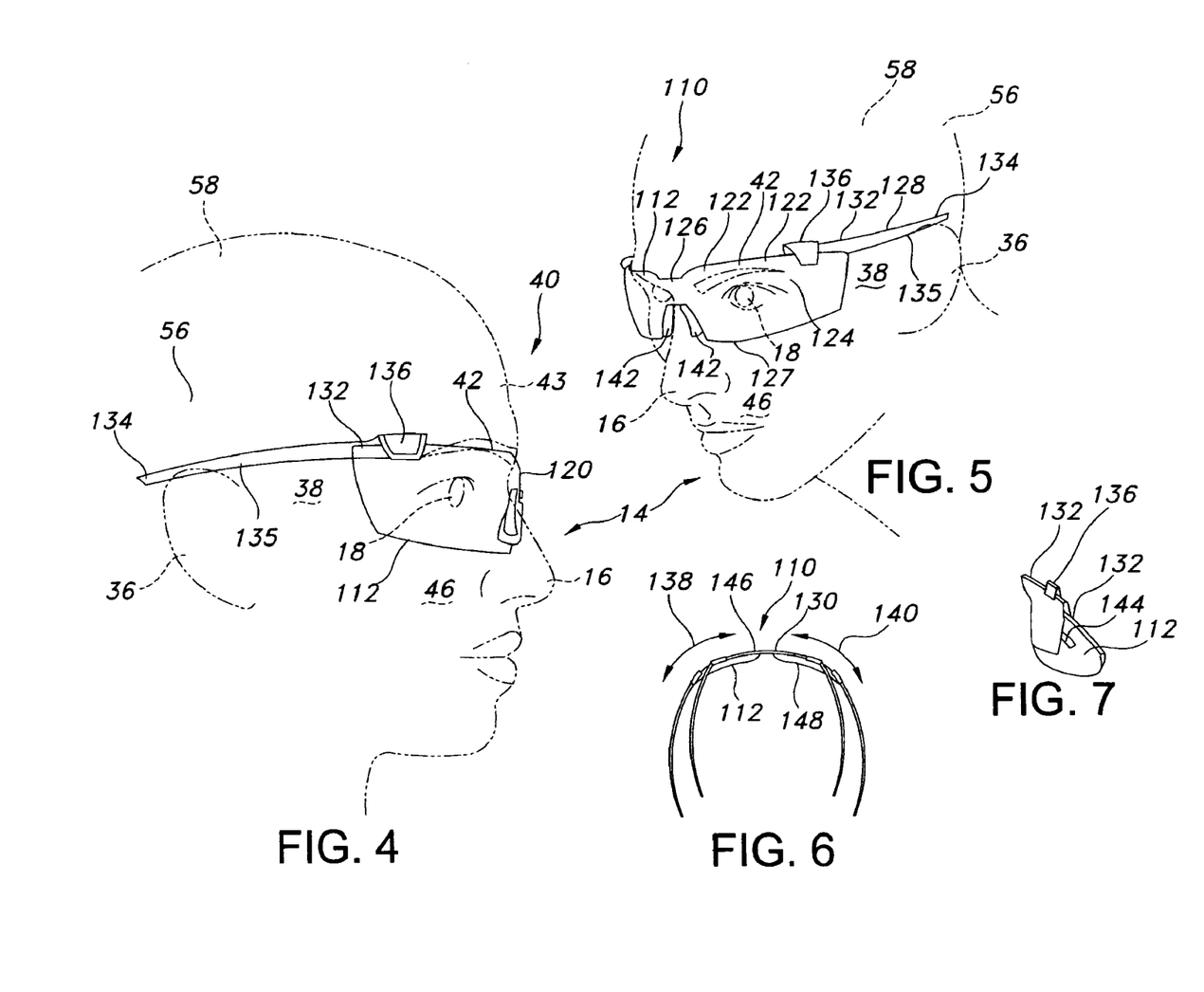
FIG. 4 is a side view of another embodiment of eyewear of the present invention, showing a common lens extending across a user's eyes and slidable, adjustable ear pieces coupled thereto.
FIG. 5 is a perspective view of the eyewear of FIG. 4.
FIG. 6 is a top plan view of the eyewear of FIGS. 4 and 5, showing the adjustability and movability of each ear piece relative to the lens.
FIG. 7 is a partial perspective view of the eyewear of FIGS. 4-6, showing the removable clamp which slidable holds each ear piece to the lens.

In another embodiment of the invention, the eyewear 110 shown in FIGS. 4-7 is similar to the eyewear 10 shown in FIGS. 1-3 and described in detail previously herein, except that the eyewear 110 has features which differ from those of eyewear 10. In the present embodiment, the eyewear 110 includes at least one lens 112, as shown in FIGS. 4-6. The lens may include a single lens 112 which extends generally across a user's face 14 and specifically across a user's nose 16 to cover both eyes 18 and thereby to provide protection to both eyes 18.

Desirably the lens 112 extends a distance 120 from the user's eyes and is configured to cover or extend over each of a user' eyes 18 from the distance 120 to provide protection thereto. The lens 112 desirably includes at least one, and in this embodiment a pair of first portions 122 which are positioned adjacent a user's nose 16. The lens 112 desirably also includes a pair of second portions 124 which are positioned adjacent an outer edge 25 of a user's eye 18. The lens 112 includes a connector 126 which is positioned across a user's nose 16. The lens 112 may include a frame positioned about at least a portion of an outer edge 127 of the lens 112 (not shown).

A pair of ear pieces 128 are desirably coupled to the lens 112 along an upper edge 130 of the lens 112 near the second portions 124 thereof. Each ear piece 128 is configured to hold the lens 112 adjacent a user's face 14. Desirably, each ear piece 128 includes a first end 132 and a second end 134. A temple piece 135 desirably extends between the first end 132 and the second end 134.

The first end 132 desirably includes a U-shaped groove which is positioned over the upper edge 130 and a releasable clamp 136 also having a U-shaped groove which is positionable about and desirably releasably coupled to the upper edge 130 of the lens 112, as illustrated best in FIG. 7. The first end 132 is moveably and slidably positionable along the upper edge 130 so that the ear pieces 128 may be moved in a direction 138 inward toward a user's nose 16 or a direction outward 140, away from a user's nose 16, as shown in FIG. 6. This adjustability of the ear pieces 128 desirably provides a custom fit to the shape and/or configuration of an outer circumference 56 of a user's head 58. The second end 134 of each ear piece 128 is desirably positioned adjacent a user's ear 36 when the eyewear 110 is worn. Similarly, the temple piece 135 is desirably configured to be positioned adjacent a user's temple 38. It will be appreciated that adjustment of the first end 132 permits the proper fit of the temple piece 135 and the second end 134 of the ear pieces 128 against a user's head 58, and also assists in providing a proper fit of the lens 112 to a user's face 14.

The eyewear 110 may also include a pair of holders 142 which are pivotably coupled to the eyewear 110, desirably at or in the general area of the connector 126, as illustrated in FIGS. 4 and 5. The holders 142 are desirably coupled at one end to the lens 112 or equivalent structure such that the holders 142 together form a V or U-shape. Each holder 142 is desirably individually moveable to provide a custom fit to a user's nose 16. Each holder 142 is desirably configured to be positioned against a side of a user's nose 16, to comfortably hold the lens 112 on a user's face 14.

The upper edge 130 of the lens 112 may include a ridge 144 on either an outer surface 146 or an inner surface 148 of the lens 112 (FIG. 7). The ridge 144 desirably provides a guide for the groove on the first end 132 of each ear piece 128 and assist the clamp 136 in coupling each ear piece 128 firmly to the lens 112. This coupling may provide slideable adjustment of each ear piece 128 on the lens 112.

The lens 112 desirably follows the general curvature of a user's brow 42 and/or forehead 43, as shown in FIGS. 5 and 6. This curvature provides peripheral protection to a user's eyes 18.

In an alternative embodiment, it will be appreciated that the lens 12 may be provided as a pair of lenses, with one lens extending over one of each of the eyes of a user when the eyewear is positioned on a user's face (not shown). In such an embodiment, a frame may be provided around at least a portion of an outer edge of each lens (not shown). In addition, a nose piece will desirably be provided to assist in holding the lenses to a user's face (not shown). In such an alternative, a nose piece may be provided as such as the holders or as a portion of a frame (not shown).

In another embodiment of the invention, the eyewear 210 shown in FIGS. 8-11 is similar to the eyewear 10, 110 shown in FIGS. 1-7 and described in detail previously herein, except that the eyewear 210 has features which differ from those of eyewear 10 and 110. In the present embodiment, the eyewear 210 desirably includes a pair of lenses 212, as shown in FIGS. 8-11.

Desirably, each of the pair of lenses 212 extends a distance 220 from the user's eyes 18 and each is configured to cover or extend over at least one of a user' eyes 18 from the distance 220 to provide protection thereto. Each of the lenses 212 desirably includes a first portion 222 which is positioned adjacent a user's nose 16. Each lens 212 desirably also includes a second portion 224 which is positioned adjacent an outer edge 25 of a user's eye 18. Each lens 212 is desirably coupled, directly or indirectly, to a frame 260.

Figures 8, 9, 10, 11:
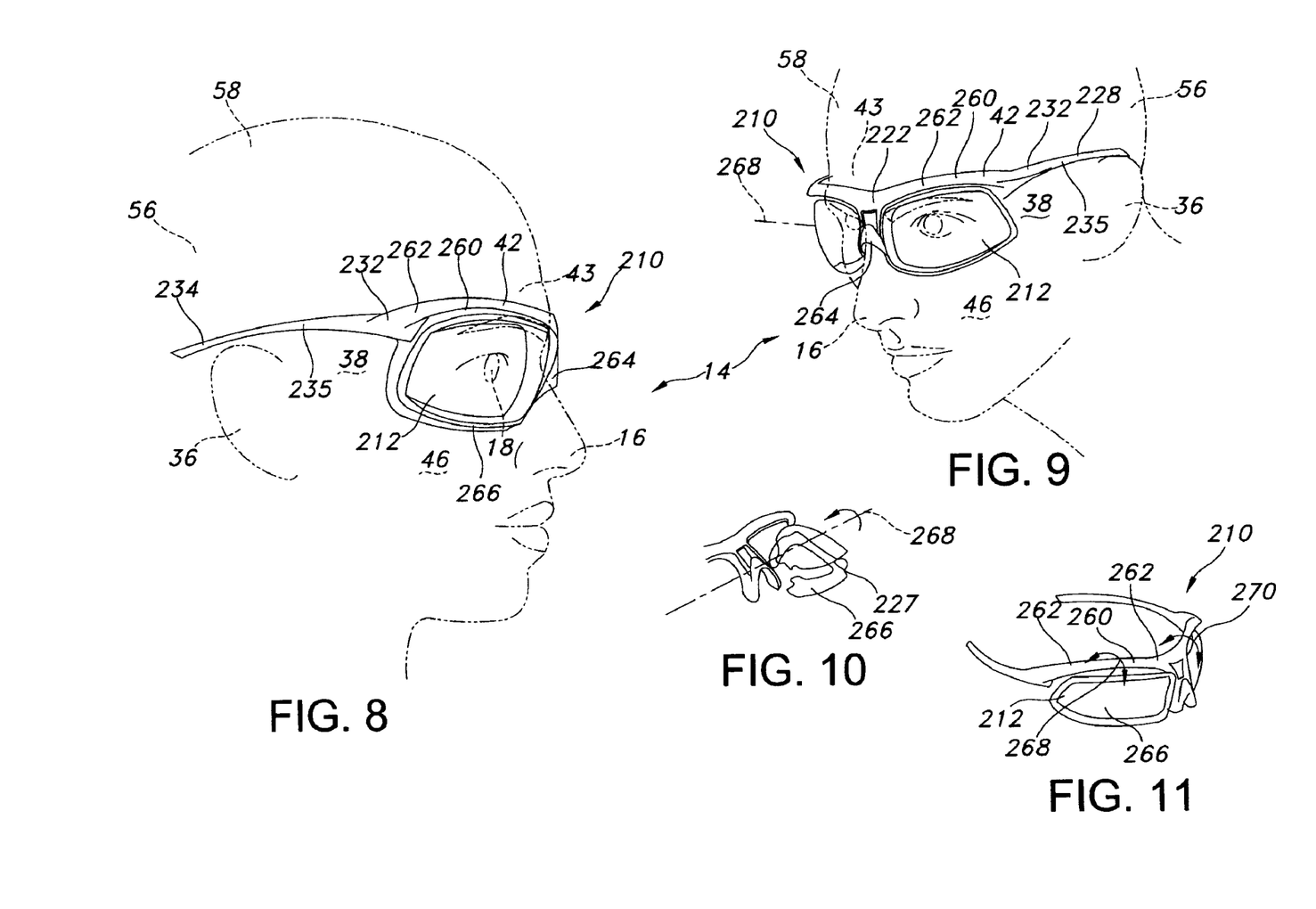
FIG. 8 is a side view of yet another embodiment of eyewear of the present invention, showing a pair of lenses, each coupled in a cantilevered manner to a portion of a frame.
FIG. 9 is a perspective view of the eyewear of FIG. 8.
FIG. 10 is a partial exploded view of the lens, lens frame and nose piece of the eyewear of FIGS. 8-9.
FIG. 11 is a perspective view of the eyewear of FIGS. 8-10, showing the pivotable movement of the lenses.

The frame 260 in the present embodiment desirably includes a brow portion 262 which extends over a user's brow 42 and forehead 43. The brow portion 262 may also include a nose piece 264 which extends over at least a portion of a user's nose 16. Each lens 212 may also include a separate lens frame 266 which is positioned about at least a portion of an outer edge 227 of each lens 212. The lens 212 or the lens frame 266 desirable couples to a portion of the frame 260 such as the nose piece 264. While the lens 212 and/or the lens frame 266 may be positioned against the frame 260, only a portion of each lens 212 adjacent the first portion 122 (or, alternatively, the lens frame 266) is coupled to the frame 266. Each lens 212 is desirably movably coupled to the nose piece 264 such that each lens 212 may be individually moved or pivoted away from the brow portion 262 of the frame 260 such that each lens 212 is in contact with only the nose piece 264, and no other portion of the lens 212 or lens frame 266 contacts the frame 260. Desirably, each lens 212 is moveably coupled in a cantilevered position to the nose piece 264 (FIGS. 10 and 11). Such coupling may be made, but not by way of limitation, via a pin and aperture arrangement between each lens 212 and each side of the nose piece 264, respectively, although it will be understood that other fasteners and/or other mechanisms may be used. Each lens 212 is separately and individually movable away from the frame 260, and this movability permits air flow and venting around a substantial portion of the lens 212.

Each lens 212 is desirably moveably coupled to the nose piece 264 and each lens moves on an axis 268. The axis 268 is desirably, when a user is in an upright position wearing the eyewear 210, a horizontal axis 268.

The frame 260 also includes a pair of ear pieces 228 which may be integrally formed with the frame 260 or, alternatively, which may be formed separately and hingeably coupled to the frame 260 in a well known manner (not shown). Each ear piece 228 is desirably formed with the frame 260 near the second portions 224 of each lens 212. Each ear piece 228 is configured to cooperate with the brow portion 262 and the rest of the frame 260 to hold the lenses 212 adjacent a user's face 14.

Desirably, each ear piece 228 includes a first end 232 which is formed adjacent to or coupled to the brow portion 262 and a second end 234 which is configured to be positioned adjacent a user's ear 36. A temple piece 235 desirably extends between the first end 232 and the second end 234 of each ear piece 228. At least a portion of each ear piece 228 and/or the frame 260 desirably has resiliency to permit the eyewear 210 to adapt to and fit a user's head 58.

Figures 12, 13:
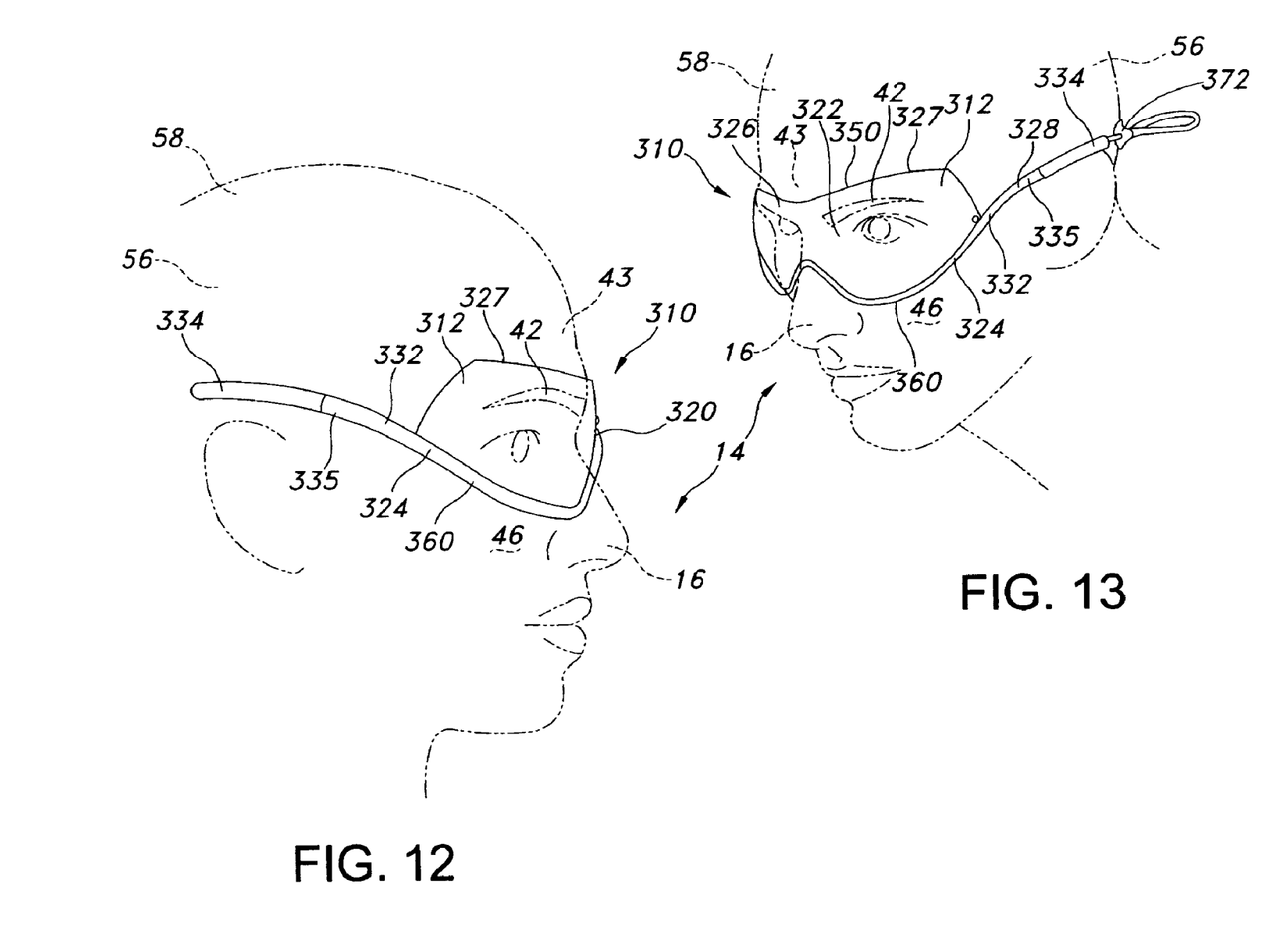
FIG. 12 is a side view of still another embodiment of eyewear of the present invention, showing a common lens extending across a user's eyes and a partial frame coupled thereto including a lanyard which is releasably tensioned about an outer circumference of a user's head.
FIG. 13 is a perspective view of the eyewear of FIG. 12.

In another embodiment of the invention, the eyewear 310 shown in FIGS. 12 and 13 is similar to the eyewear 10, 110 and 210 shown in FIGS. 1-11 and described in detail previously herein, except that the eyewear 310 has features which differ from those of eyewear 10 and 110. In the present embodiment, the eyewear 310 includes at least one lens 312, as shown in FIGS. 12 and 13. The lens 312 may include a single lens 113 which extends generally across a user's face 14 and specifically across a user's nose 16 to cover both eyes 18 and thereby to provide protection to both eyes 18.

Desirably the lens 312 extends a distance 320 from the user's eyes and is configured to cover or extend over each of a user' eyes 18 from the distance 320 to provide protection thereto. The lens 312 desirably includes at least one, and in this embodiment a pair of first portions 322 which are positioned adjacent a user's nose 16. The lens 312 desirably also includes a pair of second portions 324 which are positioned adjacent an outer edge 25 of a user's eye 18. The lens 312 includes a connector 326 which is positioned across a user's nose 16. The lens 312 may include a frame 360 positioned about at least a portion of an outer edge 327 of the lens 312.

The frame 360 is configured to extend about an outer circumference 56 of a user's head 58, as shown in FIG. 13. The frame 360 desirably, but not by way of limitation, provides a continuous circle for encircling a user's head 58. The frame 360 may include a lanyard section 370 which permits the eyewear 310 to be hung around a user's neck (not shown). The frame 360 desirably includes a tension controller 372 positioned on a portion of the lanyard section 370 configured to adjust the tension of the frame 360 against a user's face 14.

The frame 360 may include ear pieces 328 which are desirably, but not by way of limitation, integrally formed with the frame 360. Each ear piece 328 may include a first end 332 which may be positioned near the second portion 324 of the lens 312, and a second end 334 which may be positioned adjacent a user's ear 36. Each ear piece 328 may include a temple piece 335 which extends between the first end 332 and the second end 334. The second end 334 desirable couples to the lanyard section 370. Alternatively, each ear piece 328 may include a first end 332 and the lanyard section 370 which includes the tension controller 372. The tension controller 372 may include clamps, such as frictionally adjusted clamps, and so forth, which permit easy adjustability of the tension of the frame 360 and lens 312 against a user's face 14 and head 58. The tension controller 372 may be moved about the frame 360 to facilitate obtaining a comfortable tension. The frame 360 may include fasteners which may couple at least a portion of the lens 312 to at least a portion of the frame 360.

When the eyewear 310 is worn by a user, it may be positioned such that at least a portion of an upper edge 350 of the lens 312 moves away from a user's forehead 43 when the frame 360 is adjusted firmly against a user's face 14 and head 58 to provide venting and airflow to a portion of a user's face 14. Desirably, at least a portion of the frame 360 is formed from a resilient material which adapts to a shape of a user's face 14 and outer circumference 56 of a user's head 58. In addition, at least a portion of the lens 312 may be formed from a resilient material which permits the lens 312 to cooperate with the frame 360 to fit closely to a user's face 14.

In an alternative embodiment, it will be appreciated that the lens 312 may be provided as a pair of lenses, with one lens extending over one of each of the eyes of a user when the eyewear is positioned on a user's face (not shown). In such an embodiment, a nose piece will desirably be provided to assist in holding the lenses to a user's face (not shown). Alternatively, a nose piece may be provided as a portion of a frame (not shown), or at least a portion of a nose piece may be coupled to the lens of the present embodiment (not shown). A frame positioned about at least a portion of each lens may also be provided (not shown).

Figures 14, 15, 16, 17:
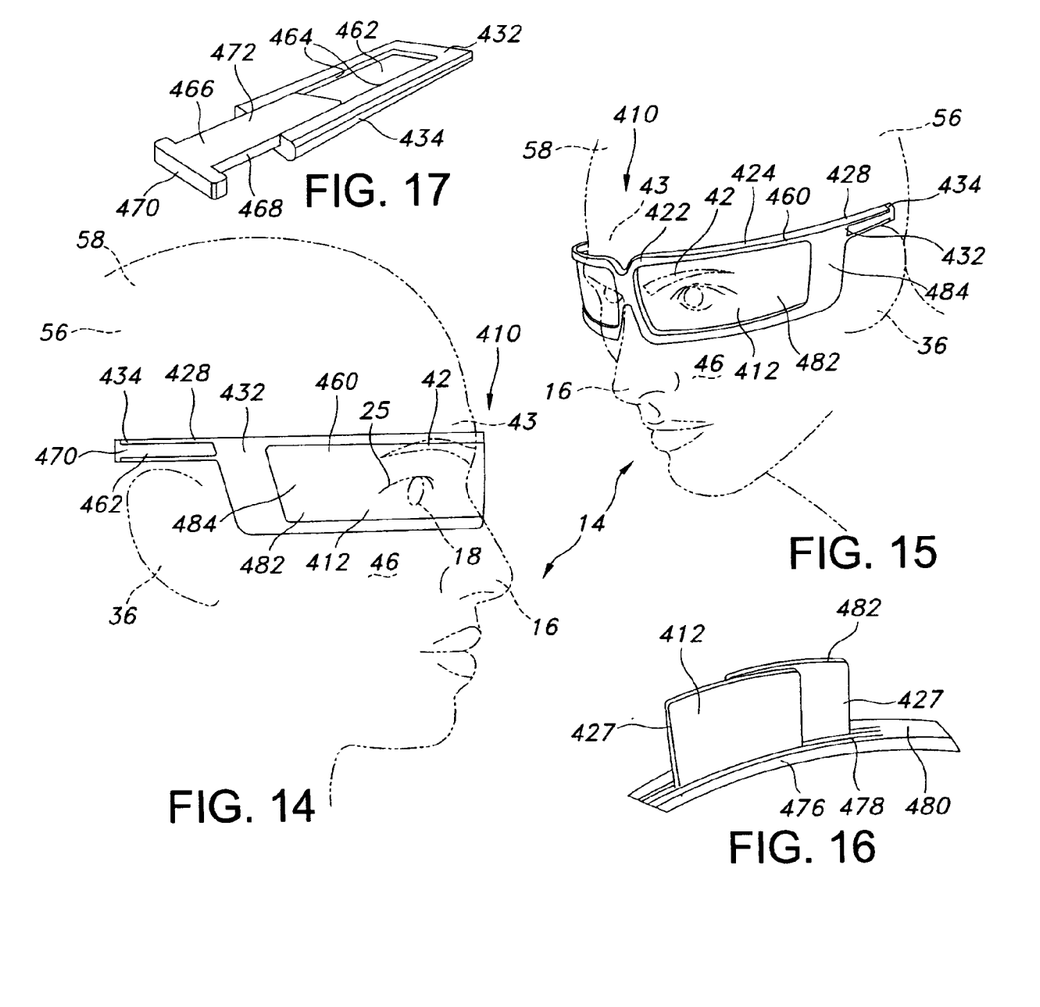
FIG. 14 is a side view of still yet another embodiment of eyewear of the present invention, showing a pair of first lenses and a pair of second lenses positioned adjacent thereto.
FIG. 15 is a perspective view of the eyewear of FIG. 14.
FIG. 16 is a partial perspective view of the eyewear of FIGS. 14 and 15, showing the slidability and adjustability of the two pair of lenses.
FIG. 17 is a partial perspective view of a portion of one ear piece of the present embodiment, showing a slideable adjustment of the ear piece.

In another embodiment of the invention, the eyewear 410 shown in FIGS. 14-17 is similar to the eyewear 10, 110, 210 and 310 shown in FIGS. 1-13 and described in detail previously herein, except that the eyewear 410 has features which differ from those of eyewear 10, 110, 210 and 310. In the present embodiment, the eyewear 410 desirably includes a pair of lenses 412, as shown in FIGS. 14-16.

Desirably, each of the pair of lenses 412 extends a distance 420 from the user's eyes 18 and each is configured to cover or extend over at least one of a user' eyes 18 from the distance 420 to provide protection thereto. Each of the lenses 412 desirably includes a first portion 422 which is positioned adjacent a user's nose 16. Each lens 412 desirably also includes a second portion 424 which is positioned adjacent an outer edge 25 of a user's eye 18. Each lens 412 is desirably coupled to a frame 460.

The frame 460 in the present embodiment surrounds an outer edge 427 of each lens 412 and include a nose piece 464 which extends across a portion of a user's nose 16. The second portion 424 of the lens 412 may extend a distance away from an outer edge 25 of a user's eye 18, and may extend near a user's temple 38 and ear 36.

The frame 460 may also include a pair of ear pieces 428 which may be integrally formed with the frame 460 or, alternatively, which may be formed separately and hingeably and/or slideably coupled to the frame 460 (not shown). Each ear piece 428 is desirably formed near the second portions 424 of each lens 412. Each ear piece 428 is configured to cooperate with the frame 460 to hold the lenses 412 adjacent a user's face 14.

Desirably, each ear piece 428 includes a first end 432 which is formed adjacent to or coupled to the frame 460 and a second end 434 which is configured to be positioned adjacent a user's ear 36. The second end 434 may be provided with a pair of spaced-apart grooves 464, as illustrated in FIG. 17.

At least a portion of each second end 434 may provide a track 462 formed therein. An extendable rail 466 desirably having a pair of rounded tongue edges 468 may be provided to slideably move on the track 462. In addition, the rail 466 may include a stemmed end 470. The tongue edges 468 of the rail 466 are configured to slideably coupled to and move withing the grooves 464 of the rail 466 to provide adjustability to the eyewear 410 allowing for a custom fit to a user's head 58. In addition, at least a portion of each ear piece 428 desirably has resiliency to permit the eyewear 410 and ear pieces 428 to better adapt to a shape of a user's head 58.

In addition, the rail 466 and stem end 470 may provide a surface 472 suitable for accepting writing, printing, and so forth, so that the eyewear 410 may include personalization, such as, by way of non-limiting example, design indicia (not shown) such as, for example, a logo, a user's name, a user's company, and so forth, may be printed or written on the surface 472. It will be appreciated that such design indicia 468 may include any letter, number, picture and/or symbol, and so forth.

Upper edges (not shown) and lower inner edges 476 of the frame 460 includes a pair of grooves, that is, an inner groove 478 and an outer groove 480 which run generally parallel to each other on the upper and lower inner edges 474, 476 of the frame 460. The lenses 412 of the present embodiment act as first lenses 412. A second pair of lenses 482 act as second lenses 482, as shown best in FIG. 16. At least a portion of the outer edge 427 of the first lenses 412 are desirably, but not by way of limitation, slideably positioned in the inner grooves 478. At least a portion of the outer edges 427 of the second pair of lenses 482 are slideably positioned in the outer grooves 480 of the frame 460. This arrangement permits a user to select the first lenses 412 or the second lenses 482 to view through, with the lenses not chosen moved to each outer periphery 484 of the eyewear 410, as illustrated in FIGS. 14 and 15. In addition, the arrangement permits a user to chose both first and second lenses 412, 482 to see or view through, or just one of the first lenses 412 or second lenses 482. Each set of first and second lenses 412, 482 may include the same or different features or characteristics, such as, but not by way of limitation, different tints, different protections, such as for UV light, laser light, chemical splash, magnification, debris deflection, and so forth.

Figure 18:
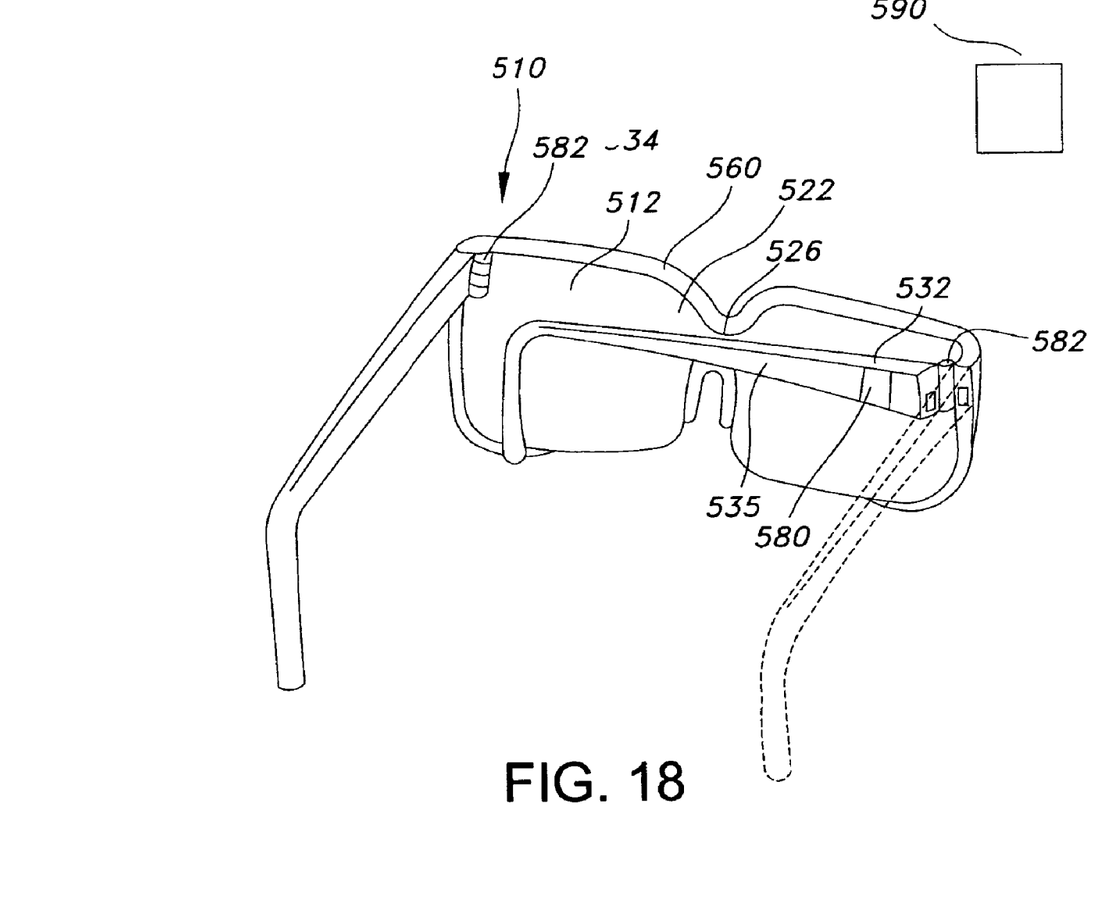
FIG. 18 is yet another embodiment of eyewear of the present invention, showing eyewear having an RFID tag on an ear piece which, when the ear piece is moved from a folded position into a position (shown in phantom lines) when the eyewear is donned, a contact point on the ear piece and another contact point on the frame provide a circuit which permits the RFID tag to send and/or receive a transmission.

One or more of the eyewear 10, 110, 210, 310, 410 may include an RFID tag coupled thereto. In the present embodiment, the eyewear 510 shown in FIG. 18 is similar to the eyewear shown in FIGS. 1-17 and described in detail previously herein, except that the eyewear 510 includes an RFID tag 580.

The eyewear 510 includes at least one lens 512. The lens 512 may include a single lens which extends generally across a user's face and specifically across a user's nose to cover both eyes and thereby to provide protection to both eyes, as shown in FIG. 18, or a pair of lenses (not shown).

Desirably the lens 512 extends a distance from the user's eyes and is configured to cover or extend over each of a user' eyes from the distance to provide protection thereto. The lens 512 desirably includes at least one, and in this embodiment a pair of first portions 522 which are positioned adjacent a user's nose 16 when the glasses are positioned on a user's face (not shown). The lens 512 desirably also includes a pair of second portions 524 which are positioned adjacent an outer edge of a user's eye. The lens 512 includes a connector 526 which is positioned across a user's nose. The lens 512 may include a frame 560 positioned about at least a portion of an outer edge 527 of the lens 512.

The eyewear 510 desirably includes a pair of ear pieces 528 which are movably connected by a movable connector 582, in this instance, a hinge, to the frame 560 and/or the lens 512. Each ear piece 528 is configured to hold the lens 512 adjacent a user's face. Desirably, each ear piece 528 includes a first end 532 and a second end 534. A temple piece 535 desirably extends between the first end 532 and the second end 534.

The movable connector 582 may include any connector which operates as shown and/or described may be used. Therefore, slidable ear pieces, telescoping earpieces, and so forth may also be used, as well as pivotable and/or rotatable ear pieces (not shown).

The RFID tag 580 is desirably provided on one ear piece 528 of the eyewear 510. One method of RFID tag activation may include providing at least one movable connector 582 to the eyewear 510. The RFID tag 580 of the ear piece 528 may be coupled to and/or connected to a contact point 586 on the first end 532 of the ear piece 528. Another contact point 588 may be provided on the lens 512 and/or frame 560. When the eyewear 510 is opened for use, that is, unfolded to be positioned on a user's face, the ear piece's 528 contact point 586 contacts and/or couples to the contact point 588 of the lens 512 and/or frame 560. When this occurs, a circuit is completed. The completion of the circuit may act in several different ways.

In one method, the RFID tag 580 is unshielded, and it permits the RFID tag 580 to transmit and/or receive a transmission from an RFID reader or scanner 590 which is located in or near the environment in which the eyewear 510 is being donned. In another method, completion of the circuit provides the requisite antennae (not shown) for the RFID 580 tag to transmit and/or receive a signal from an RFID reader/scanner 590. Alternatively, a telescoping ear piece or portion of the eyewear may complete a circuit to send or receive a transmission for an RFID tag when two telescoping or sliding portions of the ear piece or eyewear, each with contact points, contact each other (not shown). This arrangement may also be effective for other folding and/or sliding portions of the eyewear (not shown). It will be appreciated that other methods for activation and/or signal transmission from/to such an RFID tag may be used.

The RFID tag 580 may be an active or passive tag. In either situation, the RFID tag 580 desirably does not become activated until the eyewear 510 is opened in a position to be worn, as illustrated by the phantom lines in FIG. 18. That is, the RFID tag 580 cannot be queried by an RFID reader/scanner if the eyewear 510 is folded and placed in a user's pocket. Such RFID tags used with safety equipment are disclosed in U.S. Pat. No. 6,853,303, which is hereby incorporated by reference herein for all purposes. RFID tags and RFID tag readers/scanners are known in the art and commercially available. Some tag readers/scanners may include alarms or other recognition systems. Such alarms, and so forth, may be activated when an individual passes through an environment having a reader/scanner and the reader/scanner, and upon querying all available RFID tags, does not find all expected RFID tags to read or scan.

It will be appreciated that the features and/or components of one embodiment may be combined, in whole or in part, with another embodiment. In some circumstances, such combination may yield yet another embodiment. Any embodiment herein may ear pieces which are operable as described for RFID tags.

While the present invention has been described in connection with certain preferred embodiments, it is to be understood that the subject matter encompassed by way of the present invention is not to be limited to those specific embodiments. On the contrary, it will be appreciated that some elements and/or articles may be used with other elements or articles. It is intended for the subject matter of the invention to include all alternatives, modifications and equivalents as can be included within the spirit and scope of the invention.

What is claimed is:

1. Eyewear adapted to protect a user's eyes, the eyewear comprising:
   at least one lens, the lens having at least one first portion positioned adjacent a user's nose and at least one second portion which is positioned adjacent an outer edge of a user's eye when the eyewear is positioned on a user's face, the lens positioned to extend a distance from a user's eye and the lens configured to cover a user's eye from the distance; and
   a pair of ear pieces, each ear piece having a first end which is configured to be slideably and releasably coupled to an upper edge of the lens and a second end which is formed to be positioned adjacent a user's ear when the eyewear is positioned on a user s face such that each ear piece is releasably coupled to the lens and configured to be slideably moved along the upper edge of the lens to permit the ear pieces to move closer or farther away from a user's head such that the combination of the lens and each ear piece cooperate to provide a custom fit to a user's head.

2. The eyewear of claim 1, wherein the nose piece includes a pair of holders configured to be positioned against each side of a user's nose, and wherein the holders are each moveable to provide adjustment and a custom fit of the holders to a user's nose.

3. The eyewear of claim 2, wherein a clamp is coupled to a first end of each ear piece and the clamp permits each ear piece to be slideably moved and releasably coupled to the lens.

4. The eyewear of claim 3, wherein the lens includes a ridge positioned adjacent the upper edge.

5. The eyewear of claim 4, wherein the clamp is positioned over the ridge to slideably couple each ear piece to the lens.

* * * * *